(12) United States Patent
Jeong et al.

(10) Patent No.: US 12,531,315 B2
(45) Date of Patent: Jan. 20, 2026

(54) UNIT CELL AND BATTERY CELL INCLUDING THE SAME

(71) Applicant: LG Energy Solution, Ltd., Seoul (KR)

(72) Inventors: Hyeok Jeong, Daejeon (KR); Seong Won Choi, Daejeon (KR); Yong Jun Lee, Daejeon (KR); Su Taek Jung, Daejeon (KR); Soon Kwan Kwon, Daejeon (KR); Sangho Bae, Daejeon (KR); Minwook Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 750 days.

(21) Appl. No.: 17/751,004

(22) Filed: May 23, 2022

(65) Prior Publication Data

US 2022/0376358 A1    Nov. 24, 2022

(30) Foreign Application Priority Data

May 24, 2021  (KR) .................. 10-2021-0066461
Apr. 19, 2022  (KR) .................. 10-2022-0048387

(51) Int. Cl.
  *H01M 50/46*   (2021.01)
  *H01M 10/0525* (2010.01)
  *H01M 10/0583* (2010.01)
  *H01M 50/466*  (2021.01)

(52) U.S. Cl.
  CPC ..... *H01M 50/461* (2021.01); *H01M 10/0525* (2013.01); *H01M 10/0583* (2013.01); *H01M 50/466* (2021.01)

(58) Field of Classification Search
  None
  See application file for complete search history.

(56) References Cited

U.S. PATENT DOCUMENTS

| 4,049,882 | A |  | 9/1977 | Beatty |
| 4,080,727 | A |  | 3/1978 | Stolle et al. |
| 5,981,107 | A | * | 11/1999 | Hamano ............... H01M 10/05 429/231.95 |
| 6,051,342 | A |  | 4/2000 | Hamano et al. |
| 8,617,257 | B2 |  | 12/2013 | Kadowaki et al. |
| 9,356,312 | B2 |  | 5/2016 | Lee et al. |
| 10,476,096 | B2 |  | 11/2019 | Kim et al. |
| 2002/0182490 | A1 |  | 12/2002 | Cho et al. |
| 2006/0073380 | A1 |  | 4/2006 | Kim et al. |

(Continued)

FOREIGN PATENT DOCUMENTS

| EP | 3940826 A1 | 1/2022 |
| EP | 3951972 A1 | 2/2022 |

(Continued)

OTHER PUBLICATIONS

The Epoxy Adhesive Test Measurement Guide (Year: 1999).*

(Continued)

*Primary Examiner* — Jennifer A Boyd
(74) *Attorney, Agent, or Firm* — Lerner David LLP

(57) ABSTRACT

A unit cell includes an electrode positioned between a first separator and a separator in a stack. A first adhesive is positioned between the electrode and at least one of the first and second separators, and a second adhesive is positioned between the first separator and the second separator. A shear strength of the first adhesive is less than or equal to a shear strength of the second adhesive.

21 Claims, 6 Drawing Sheets

(56) References Cited

U.S. PATENT DOCUMENTS

| | | |
|---|---|---|
| 2010/0310930 A1 | 12/2010 | Park et al. |
| 2011/0177383 A1 | 7/2011 | Culver et al. |
| 2013/0224552 A1* | 8/2013 | Hong ............... H01M 50/451 |
| | | 429/144 |
| 2013/0316205 A1 | 11/2013 | Kim et al. |
| 2014/0037857 A1 | 2/2014 | Cheverton et al. |
| 2014/0154565 A1 | 6/2014 | Ku et al. |
| 2014/0329141 A1 | 11/2014 | Onizuka et al. |
| 2015/0093629 A1 | 4/2015 | Sayre et al. |
| 2015/0180082 A1 | 6/2015 | Jung et al. |
| 2015/0325884 A1 | 11/2015 | Fukunaga et al. |
| 2016/0111699 A1 | 4/2016 | Ahn et al. |
| 2017/0012266 A1 | 1/2017 | Arora et al. |
| 2017/0117509 A1 | 4/2017 | Schumann et al. |
| 2017/0179453 A1 | 6/2017 | Uejima et al. |
| 2017/0331091 A1 | 11/2017 | Modeki |
| 2017/0358783 A1 | 12/2017 | Kim |
| 2018/0034028 A1 | 2/2018 | Jung et al. |
| 2018/0351149 A1 | 12/2018 | Akiike et al. |
| 2019/0044177 A1 | 2/2019 | Lee et al. |
| 2019/0181412 A1 | 6/2019 | Li et al. |
| 2019/0221808 A1 | 7/2019 | Honda et al. |
| 2020/0028200 A1 | 1/2020 | Sauerteig et al. |
| 2020/0161617 A1 | 5/2020 | Heo et al. |
| 2020/0411896 A1 | 12/2020 | Hong et al. |
| 2021/0057719 A1 | 2/2021 | Song et al. |
| 2021/0320336 A1 | 10/2021 | Ahn et al. |
| 2021/0344048 A1 | 11/2021 | Sato et al. |
| 2022/0123297 A1 | 4/2022 | Lee et al. |

FOREIGN PATENT DOCUMENTS

| | | | |
|---|---|---|---|
| JP | H11121044 A | | 4/1999 |
| JP | 2002251991 A | | 9/2002 |
| JP | 2004071358 A | | 3/2004 |
| JP | 2010238425 A | | 10/2010 |
| JP | 2011165359 A | | 8/2011 |
| JP | 2014534599 A | | 12/2014 |
| JP | 5687443 B2 | | 3/2015 |
| JP | 2015532766 A | | 11/2015 |
| JP | 2016103376 A | | 6/2016 |
| JP | 2017050215 A | | 3/2017 |
| JP | 201784732 A | | 5/2017 |
| JP | 2018506820 A | | 3/2018 |
| JP | 2018113122 A | | 7/2018 |
| JP | 2018520491 A | | 7/2018 |
| JP | 2018152226 A | | 9/2018 |
| JP | 2019053862 A | | 4/2019 |
| JP | 2019091581 A | | 6/2019 |
| JP | 2019192339 A | | 10/2019 |
| JP | 2019530176 A | | 10/2019 |
| JP | WO2020-054801 A1 | | 8/2021 |
| KR | 19980064181 A | | 10/1998 |
| KR | 20010086415 A | | 9/2001 |
| KR | 100614390 B1 | | 8/2006 |
| KR | 20070108764 A | | 11/2007 |
| KR | 20080017114 A | | 2/2008 |
| KR | 20080021166 A | | 3/2008 |
| KR | 101084909 B1 | | 11/2011 |
| KR | 20110138719 A | | 12/2011 |
| KR | 101168650 B1 | | 7/2012 |
| KR | 20130102498 A | | 9/2013 |
| KR | 101589811 B1 | | 1/2016 |
| KR | 20160038600 A | | 4/2016 |
| KR | 20160039380 A | * | 4/2016 |
| KR | 20160117109 A | | 10/2016 |
| KR | 20170022042 A | | 3/2017 |
| KR | 20170027677 A | | 3/2017 |
| KR | 20170094713 A | | 8/2017 |
| KR | 20170101582 A | | 9/2017 |
| KR | 2017-0111234 A | | 10/2017 |
| KR | 101783916 B1 | | 10/2017 |
| KR | 20180000605 A | | 1/2018 |
| KR | 20180025805 A | | 3/2018 |
| KR | 20180026972 A | | 3/2018 |
| KR | 20180028411 A | | 3/2018 |
| KR | 20180080908 A | | 7/2018 |
| KR | 2018-0093321 A | | 8/2018 |
| KR | 20190097666 A | | 8/2019 |
| KR | 102071835 B1 | | 1/2020 |
| KR | 20200023852 A | | 3/2020 |
| KR | 20200058222 A | | 5/2020 |
| KR | 20210008736 A | | 1/2021 |
| KR | 20210073451 A | | 6/2021 |
| WO | 2017094252 A1 | | 6/2017 |
| WO | 2018060773 A1 | | 4/2018 |
| WO | 2018166882 A1 | | 9/2018 |
| WO | 2020197278 A1 | | 10/2020 |
| WO | 2021194285 A1 | | 9/2021 |

OTHER PUBLICATIONS

KR20160039380A Translated (Year: 2016).*
KR20170094713A Translated (Year: 2017).*
WO2018166882A1 Translated (Year: 2018).*
U.S. Pat. No. 5,981,107A with paragraph numbers (Year: 1999).*
"The Importance of Adhesive Strength: How to be sure your Adhesive is Strong Enough" webpage, pp. 1-12, PDF of relevant website pages provided.*
Masterbond "How Heat Affects the Lap Shear Strength of Structural Adhesives" webpage, pp. 1-3, PDF of relevant website pages provided.*
How Heat Affects the Lap Shear Strength of Structural Adhesives, Masterbond website—https://www.masterbond.com/articles/how-heat-affects-lap-shear-strength-structural-adhesives, first known publication date Jan. 20, 2021 according to Wayback Machine. (Year: 2021).*
Besley, Thomas. The Importance of Adhesive Strength: How to be sure your Adhesive is Strong Enough, Forgeway website—https://www.forgeway.com/learning/blog/is-your-adhesive-strong-enough, first known publication date Jul. 13, 2024 according to Wayback Machine. (Year: 2024).*
Machine Translation of: JP 2017-050215 A, Masuda et al., Sep. 3, 2017.
Extended European Search Report including Search Opinion from EP Appl. No. 22811500.2, dated Aug. 13, 2024, pp. 1-10.
International Search Report for Application No. PCT/KR2022/006015 mailed Aug. 11, 2022, pp. 1-3. [see p. 2, categorizing the cited references].
International Search Report for PCT Application No. PCTKR20214012783 dated Jan. 6, 2022, 3 pgs. [see p. 2, categorizing the cited references].
International Search Report for Application No. PCT/KR2022/006013 mailed Aug. 23, 2022, pp. 1-3. [See p. 2, categorizing the cited references].

* cited by examiner

[FIG. 1]
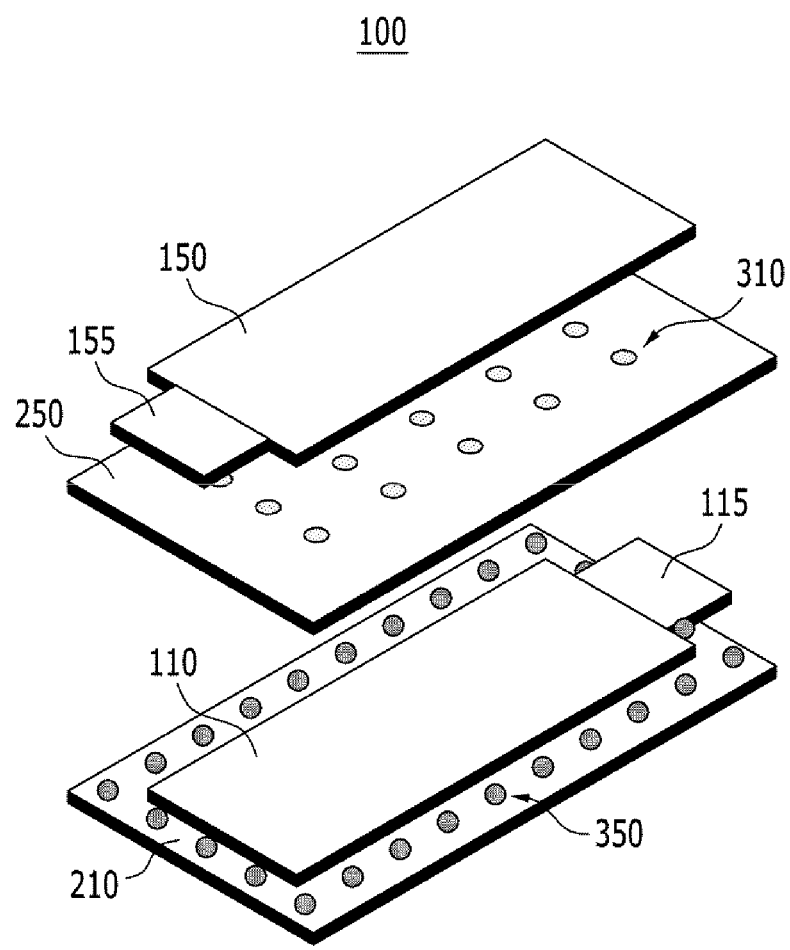

[FIG. 2]
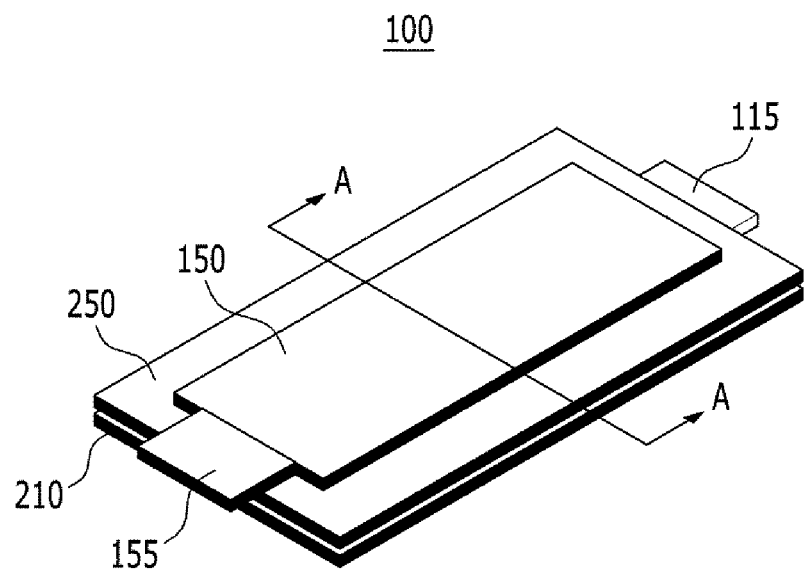
[FIG. 3]
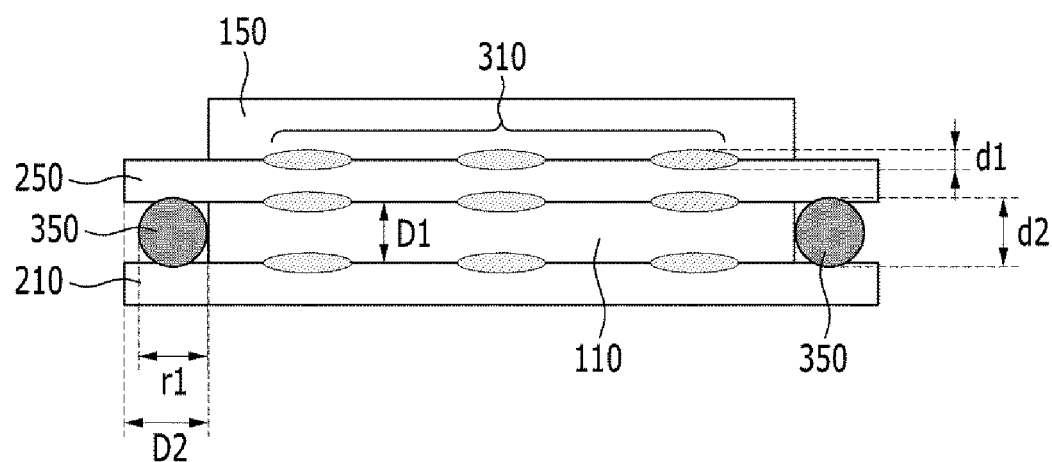

【FIG. 4】
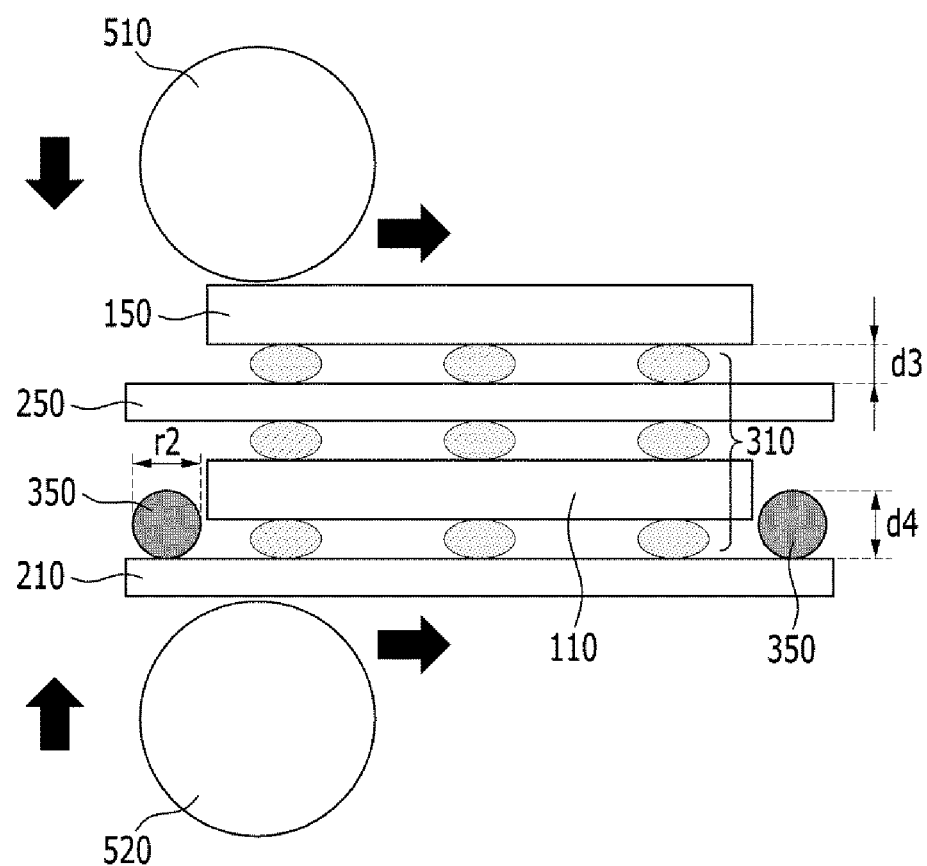

[FIG. 5]
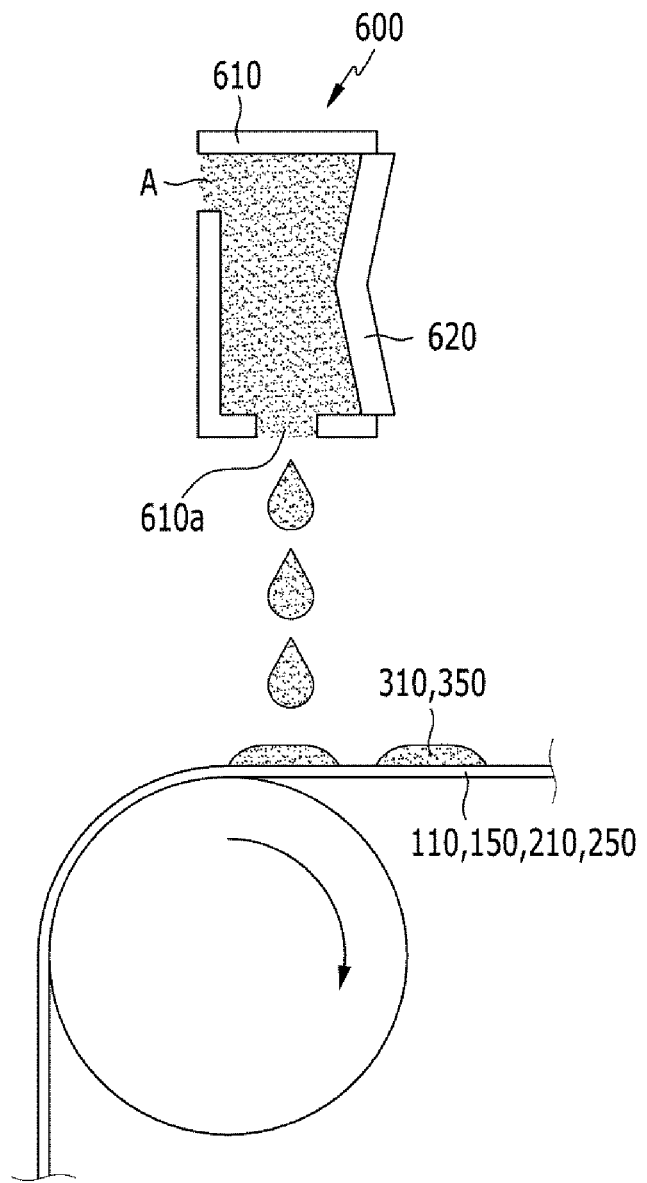

[FIG. 6]
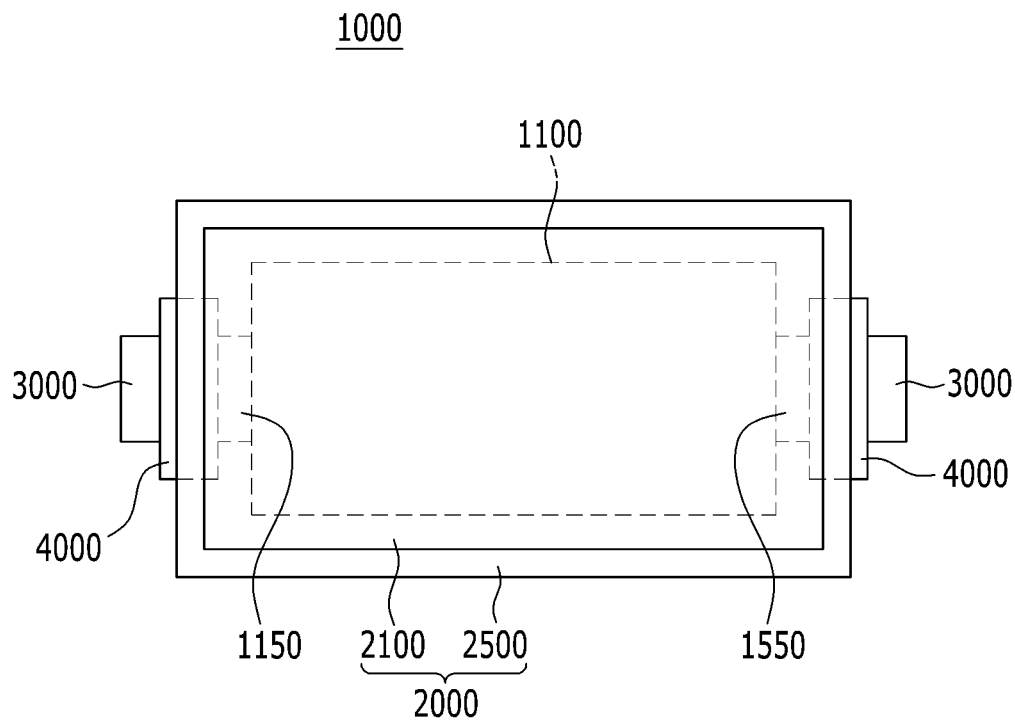
[FIG. 7]
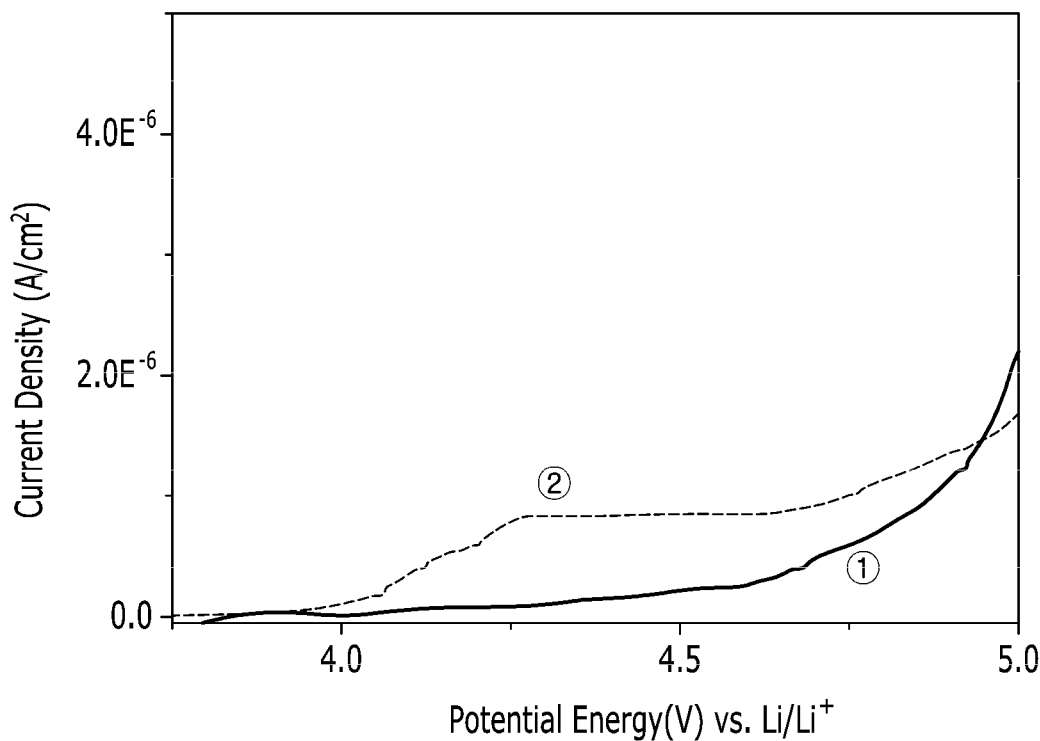

【FIG. 8】
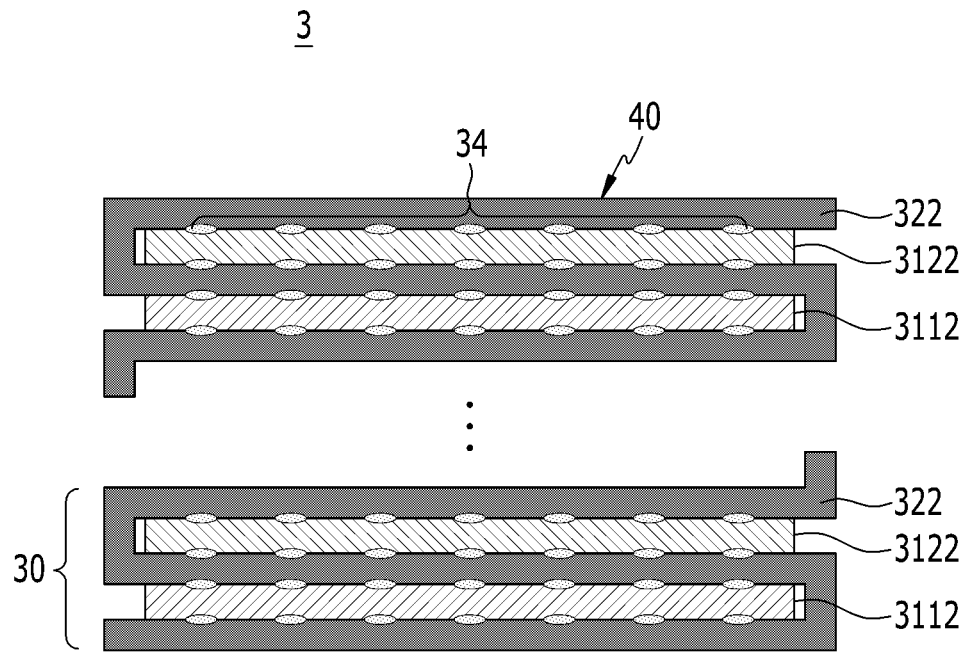
【FIG. 9】
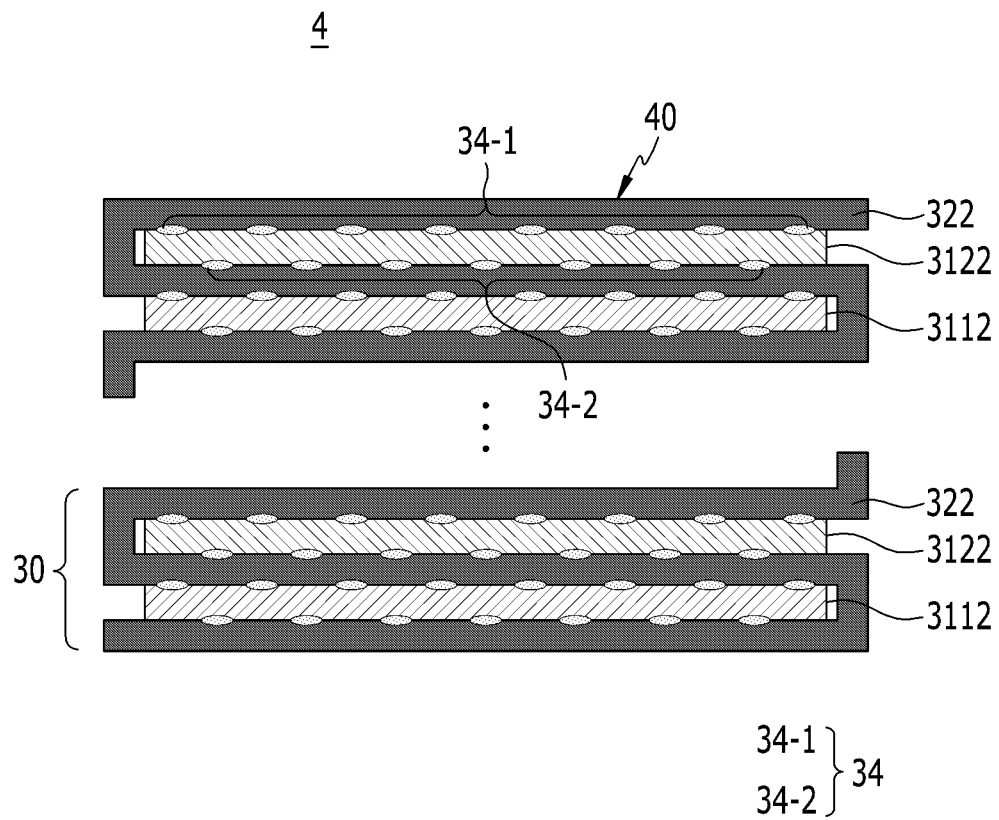

UNIT CELL AND BATTERY CELL INCLUDING THE SAME

CROSS-REFERENCE TO RELATED APPLICATIONS

This application claims priority from Korean Patent Application No. 10-2021-0066461, filed on May 24, 2021, and Korean Patent Application No. 10-2022-0048387, filed on Apr. 19, 2022, the entire disclosures of which are incorporated herein by reference.

BACKGROUND OF THE INVENTION

The present disclosure relates to a unit cell and a battery cell including the same, and more particularly to a unit cell configured to adhere an electrode to a separator as well as a separator to a separator using an adhesive composition instead of a conventional lamination using heat and pressure.

As technology development and demands for mobile devices increase, the demand for batteries as energy sources is rapidly increasing. In particular, secondary batteries have attracted considerable attention as energy sources for power-driven devices, such as electric bicycles, electric vehicles, and hybrid electric vehicles, as well as energy sources for mobile devices, such as mobile phones, digital cameras, laptop computers, and wearable devices.

Based on the shape of its battery case, such secondary batteries may be classified into a cylindrical battery (where an electrode assembly is mounted in a cylindrical metal can), a prismatic battery (where an electrode assembly is mounted in a prismatic metal can), and a pouch-type battery (where an electrode assembly is mounted in a pouch type case formed of an aluminum laminate sheet). Here, the electrode assembly mounted in the battery case is a power generating element, having a structure including a cathode, an anode, and a separator interposed between the cathode and the anode, and capable of being charged and discharged. The electrode assembly may be classified as a jelly-roll type electrode assembly and a stacked type electrode assembly. A jelly-roll type electrode assembly is one having a structure in which a long sheet-type cathode and a long sheet-type anode, which are each coated with active materials, are wound with a separator interposed between the cathode and the anode. A stacked type electrode assembly is one having a structure in which a plurality of cathodes and anodes are sequentially stacked with separators interposed between the cathodes and the anodes.

Among them, particularly advantageous is a pouch-type battery having a structure in which a stacked/folded type electrode assembly is mounted in a pouch-type battery case formed of an aluminum laminate sheet, due to advantages such as low manufacturing costs, small weight, and easy shape deformation, and therefore usage of such an arrangement is gradually increasing.

A stacked type electrode assembly is generally manufactured by preparing unit cells in advance and then stacking a plurality of the unit cells. More specifically, unit cells each comprising a separator-anode-separator-cathode stacked in order can have heat and pressure applied to them via a stacking device, thereby fixing the components to each other.

However, after being alternately stacked in the order of separator-anode-separator-cathode, a part of the separator or electrode may be shifted out of place before entering the stacking device or during the process of stacking, which can cause problems such as breakage occurring or differences in adhesive strength.

BRIEF SUMMARY OF THE INVENTION

According to an aspect of the present disclosure, there is provided a unit cell comprising a stack including an electrode positioned between a first separator and a second separator. The unit cell also includes a first adhesive part positioned at an interface defined between the electrode and at least one of the first and second separators, as well as a second adhesive part positioned at an interface defined between the first separator and the second separator. The first adhesive part is composed of a first adhesive composition, and the second adhesive part is composed of a second adhesive composition, wherein a shear strength of the first adhesive part is less than or equal to a shear strength of the second adhesive part.

The shear strength of the first adhesive part may be greater than or equal to 0.15 MPa and less than or equal to 0.5 MPa, and the shear strength of the second adhesive part may be greater than or equal to 0.15 MPa and less than or equal to 3.5 MPa.

The shear strength of the second adhesive part may be greater than or equal to 1.5 MPa and less than or equal to 3.5 MPa.

A viscosity of the first adhesive part may be less than or equal to a viscosity of the second adhesive part.

The viscosity of the first adhesive part may be greater than or equal to 50 cP at 150° C. and less than or equal to 120 cP at 150° C., and the viscosity of the second adhesive part may be greater than or equal to 50 cP at 150° C. and less than or equal to 12000 cP at 150° C.

The viscosity of the second adhesive part may be greater than or equal to 800 cP at 150° C. and less than or equal to 12000 cP at 150° C.

A thickness of the first adhesive part may be smaller than a thickness of the electrode, and a thickness of the second adhesive part may be smaller than or equal to the thickness of the electrode.

The thickness of the first adhesive part may be greater than or equal to 0.01% of the thickness of the electrode and less than or equal to 10% of the thickness of the electrode, and the thickness of the second adhesive part may be greater than or equal to 90% of the thickness of the electrode and less than or equal to 100% of the thickness of the electrode.

An adhesive strength of the first adhesive part may be greater than or equal to an adhesive strength of the second adhesive part.

The adhesive strength of the first adhesive part may be greater than or equal to 50 gf/mm$^2$ and less than or equal to 100 gf/mm$^2$, and the adhesive strength of the second adhesive part may be greater than or equal to 20 gf/mm$^2$ and less than or equal to 100 gf/mm$^2$.

The second adhesive part may be positioned between an end part of the electrode and an end part of the first and second separators.

A width of the second adhesive part may be smaller than a distance between the end part of the electrode and the end part of the first and second separators.

The first adhesive part and the second adhesive part may be each arranged in a pattern including a plurality of dots spaced apart from each other.

Each of the plurality of dots of the second adhesive part may have a diameter smaller than a distance between an end part of the electrode and an end part of the first and second separators.

The first adhesive composition may be composed of at least one of an ethylene-vinyl acetate (EVA)-based material, an acrylic-based material, and an epoxy-based material, and the second adhesive composition may be composed of at least one of an ethylene-vinyl acetate (EVA)-based material, an acrylic-based material, an epoxy-based material, a polyolefin-based material, a rubber-based material, a polyamide-based material, and a polyurethane-based material.

The second adhesive composition may be composed of at least one of a polyolefin-based material, a rubber-based material, a polyamide-based material, and a polyurethane-based material.

According to some other aspects of the present disclosure, there is provided an electrode assembly defined by a plurality of the unit cells stacked along a stacking direction. The electrode assembly includes a first interface defined between the electrode and the first separator, as well as a second interface defined between the electrode and the second separator. The first adhesive part is arranged in a first pattern over the first interface and a second pattern over the second interface, the first and second patterns each including a plurality of dots of the first adhesive part spaced apart from each other in a lateral dimension defined orthogonal to the stacking direction. Each of the plurality of dots of the first pattern are disposed at the same respective positions in the lateral dimension as the plurality of dots of the second pattern.

According to some other aspects of the present disclosure, there is provided an electrode assembly defined by a plurality of the unit cells stacked along a stacking direction. The electrode assembly includes a first interface defined between the electrode and the first separator, as well as a second interface defined between the electrode and the second separator. The first adhesive part is arranged in a first pattern over the first interface and a second pattern over the second interface, the first and second patterns each including a plurality of dots of the first adhesive part spaced apart from each other in a lateral dimension defined orthogonal to the stacking direction. Each of the plurality of dots of the first pattern are disposed at positions in the lateral dimension that are staggered with respect to the plurality of dots of the second pattern.

According to some other aspects of the present disclosure, there is provided a battery cell comprising an electrolyte solution together with an electrode assembly including a stack of a plurality of the unit cells.

The first adhesive part may be at least partially dissolved into the electrolyte solution.

The first separator and the second separator may each be respective portions of an elongated separator folded to have a zigzag shape.

According to some other aspects of the present disclosure, there is provided a method of fabricating a unit cell. The method in accordance with such aspects includes: applying a first adhesive to either or both of (i) a first face of an electrode or (ii) an abutment region of a first separator; applying the first adhesive to either or both of (i) a second face of the electrode or (ii) an abutment region of a second separator, the second face of the electrode being on an opposite side of the electrode from the first face; applying a second adhesive to either or both of (i) a peripheral region of the first separator or (ii) a peripheral region of the second separator; and forming at least a portion of a stack by stacking the electrode between the first separator and the second separator, such that the first face of the electrode abuts the abutment region of the first separator and the second face of the electrode abuts the abutment region of the second separator. The stack is desirably formed such the peripheral region of each of the first and second separators extends outwardly beyond an edge of the electrode, the peripheral regions of each of the first and second separators opposing one another without the electrode interposed therebetween. Moreover, a shear strength of the first adhesive is preferably less than or equal to a shear strength of the second adhesive.

The method of fabricating the unit cell may further comprise compressing the stack along a direction orthogonal to the first and second faces of the electrode.

The method of fabricating the unit cell may further comprise positioning the stack and an electrolyte in a battery case.

The peripheral region of each of the first and second separators may extend around the perimeter of the respective first and second separator, such that each of the peripheral regions encircles the abutment region of the respective first and second separator.

The shear strength of the first adhesive may be greater than or equal to 0.15 MPa and less than or equal to 0.5 MPa, and the shear strength of the second adhesive may be greater than or equal to 0.15 MPa and less than or equal to 3.5 MPa.

The shear strength of the second adhesive may be greater than or equal to 1.5 MPa and less than or equal to 3.5 MPa.

A viscosity of the first adhesive may be less than or equal to a viscosity of the second adhesive.

The viscosity of the first adhesive may be greater than or equal to 50 cP at 150° C. and less than or equal to 120 cP at 150° C., and the viscosity of the second adhesive may be greater than or equal to 50 cP at 150° C. and less than or equal to 12000 cP at 150° C.

The viscosity of the second adhesive may be greater than or equal to 800 cP at 150° C. and less than or equal to 12000 cP at 150° C.

A thickness of the first adhesive may be smaller than a thickness of the electrode, and a thickness of the second adhesive may be smaller than or equal to the thickness of the electrode.

The thickness of the first adhesive may be greater than or equal to 0.01% of the thickness of the electrode and less than or equal to 10% of the thickness of the electrode, and the thickness of the second adhesive may be greater than or equal to 90% of the thickness of the electrode and less than or equal to 100% of the thickness of the electrode.

An adhesive strength of the first adhesive may be greater than or equal to an adhesive strength of the second adhesive.

The adhesive strength of the first adhesive may be greater than or equal to 50 $gf/mm^2$ and less than or equal to 100 $gf/mm^2$, and the adhesive strength of the second adhesive may be greater than or equal to 20 $gf/mm^2$ and less than or equal to 100 $gf/mm^2$.

A width of the second adhesive applied to the peripheral region of either the first or second separator may be less than a width of the peripheral region to which the second adhesive is applied.

The first adhesive and the second adhesive may be each applied in a respective pattern of dots spaced apart from each other.

Each of the dots in the pattern of dots of the second adhesive may have a diameter smaller than a width of the peripheral region.

The dots in the pattern of dots of the first adhesive may be arranged in a grid of rows and columns of dots.

The first adhesive may be composed of at least one of an ethylene-vinyl acetate (EVA)-based material, an acrylic-based material, and an epoxy-based material, and the second adhesive is composed of at least one of an ethylene-vinyl acetate (EVA)-based material, an acrylic-based material, an epoxy-based material, a polyolefin-based material, a rubber-based material, a polyamide-based material, and a polyurethane-based material.

The second adhesive may be composed of at least one of a polyolefin-based material, a rubber-based material, a polyamide-based material, and a polyurethane-based material.

The first separator and the second separator may each be respective portions of an elongated separator folded to have a zigzag shape.

It is believed that by adhering the electrode to the separator and the separator to another separator using an adhesive composition, instead of a conventional lamination using heat and pressure, at least some aspects of the present invention may minimize or eliminate movement between the electrodes and separators, thereby beneficially reducing deformation and breakage of the electrodes and separators. However, the inventions disclosed herein are not limited to achieving such effects, and other additional effects not explicitly described herein may be achieved by some formulations of the inventions disclosed and claimed herein.

BRIEF DESCRIPTION OF THE DRAWINGS

FIG. 1 is an exploded perspective view of a unit cell according to an embodiment of the present disclosure;

FIG. 2 is a perspective view showing a unit cell in which the components of FIG. 1 are combined;

FIG. 3 is a cross-sectional view taken along the A-A axis of FIG. 2;

FIG. 4 is a cross-sectional view showing a process in which the unit cell of FIG. 2 is pressed;

FIG. 5 is a diagram showing a process in which a first adhesive part and a second adhesive part included in the unit cell of FIG. 2 are applied;

FIG. 6 is a top view of a battery cell according to another embodiment of the present disclosure;

FIG. 7 is a view showing Linear Sweep Voltammetry (LSV) of the adhesive composition included in the unit cell of FIG. 2;

FIG. 8 is a cross-sectional view showing an electrode assembly according to an embodiment of the present disclosure; and FIG. 9 is a cross-sectional view showing an electrode assembly according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can implement them. The disclosed embodiments may be modified in various different ways, without departing the spirit or scope of the present disclosure.

Portions that are irrelevant to the description will be omitted so as to provide a clear description of the present disclosure. Moreover, like reference numerals designate like elements throughout the specification.

Further, the size and thickness of each element are arbitrarily illustrated in the drawings for convenience of the description, and the present disclosure is not necessarily limited to those illustrated in the drawings. In the drawings, the thickness of layers, regions, etc. are exaggerated for clarity. In the drawings, the thicknesses of some layers and regions are shown to be exaggerated for convenience of the description.

Throughout the specification, when a portion is referred to as "including" a certain component, it means that the portion includes the stated components but does not exclude any other components, unless explicitly described to the contrary.

Further, throughout the specification, references to "cross-sectional" refer to a target portion viewed from the side of a cross section cut vertically.

Hereinafter, a unit cell according to an embodiment of the present disclosure will be described.

FIG. 1 is an exploded perspective view of a unit cell according to an embodiment of the present disclosure. FIG. 2 is a perspective view showing a unit cell in which the components of FIG. 1 are combined. FIG. 3 is a cross-sectional view taken along the A-A axis of FIG. 2.

Referring to FIGS. 1 and 2, a unit cell according to an embodiment of the present disclosure includes: separators 210 and 250 and electrodes 110 and 150, a predetermined number of which are alternately stacked; a first adhesive part 310 that is positioned between the separators 210 and 250 and the respective electrodes 110 and 150 and is composed of a first adhesive composition; and a second adhesive part 350 that is positioned between the separators 210 and 250 themselves and is composed of a second adhesive composition.

More specifically, the separators 210 and 250 include a lower separator 210 and an upper separator 250, and the electrodes 110 and 150 include a first electrode 110 and a second electrode 150, wherein the lower separator 210, the first electrode 110, the upper separator 250 and the second electrode 150 may be stacked in that order.

The first electrode 110 may include a first electrode tab 115 protruding in one direction, and the second electrode 150 may include a second electrode tab 155 protruding in one direction. In one example, as shown in FIGS. 1 and 2, the stacking may be performed such that the upper separator 250 is positioned between the first electrode 110 and the second electrode 150, and the stacking may be performed such that the first electrode tab 115 of the first electrode 110 and the second electrode tab 155 of the second electrode 150 are positioned in opposite directions to each other. However, the present disclosure is not limited thereto, and a structure in which the first electrode tab 115 and the second electrode tab 155 are stacked so as to be positioned in the same direction may also be included in embodiments of the disclosure.

The first electrode 110 and the second electrode 150 may each include an electrode current collector and an active material layer positioned on the electrode current collector. The active material layer may be formed of an electrode composition containing an electrode active material. More specifically, the first electrode 110 and the second electrode 150 may be a cathode and an anode. The cathode may include a cathode current collector and an active material layer containing the cathode active material, and the anode may include an anode current collector and an active material layer containing the anode active material. In one example, the first electrode 110 may be an anode, and the second electrode 150 may be a cathode, but the present disclosure is not limited thereto, and vice versa may be included in embodiments of the disclosure as well.

As the anode active material, an anode active material for a lithium secondary battery well-known in the art may be used, and, as an example, a material such as lithium metal, lithium alloy, petroleum coke, activated carbon, graphite, silicon, tin, metal oxide, or other carbons may be used.

In addition, in one example, the cathode active material may be selected from the group consisting of lithium-cobalt based oxide, lithium-manganese based oxide, lithium-nickel-manganese based oxide, lithium-manganese-cobalt based oxide, lithium-nickel-manganese-cobalt based oxide, and lithium iron phosphate, or may be a combination thereof or a composite oxide thereof.

The anode current collector and the cathode current collector are not particularly limited, as long as they have high conductivity without causing a chemical change in the battery. For example, copper, stainless steel, aluminum, nickel, titanium, calcined carbon, or aluminum or stainless steel that is surface-treated with carbon, nickel, titanium, silver, or the like may be used.

The separators 210 and 250 may separate the first electrode 110 from the second electrode 150 and provide a moving passage of lithium ion. In addition, the separators 210 and 250 include a lower separator 210 and an upper separator 250, and such separators may be made of the same materials or materials which are different from each other.

In one example, the separators 210 and 250 can be used without particular limitation as long as they are normally used as separators in a lithium secondary battery. In particular, it is desirable that the separator has low resistance to ion movement of an electrolyte solution and is excellent in its ability to be impregnated with an electrolyte solution. Specifically, porous polymer films made of polyolefin-based polymers such as ethylene homopolymer, propylene homopolymer, ethylene/butene copolymer, ethylene/hexene copolymer, and ethylene/methacrylate copolymer may be used alone, or a stacked structure having two or more of such layers may be used.

Hereinafter, the first adhesive part 310 and the second adhesive part 350 included in the unit cell will mainly be described.

Referring to FIGS. 1 and 3, the first adhesive part 310 may be positioned at one or more of the following locations: (1) between the first electrode 110 and the lower separator 210; (2) between the first electrode 110 and the upper separator 250; and (3) between the second electrode 150 and the upper separator 250.

The first adhesive part 310 may be composed of a first adhesive composition, and the second adhesive part 350 may be composed of a second adhesive composition. In one example, the first adhesive composition may be composed of at least one of an ethylene-vinyl acetate (EVA)-based material, an acrylic-based material, and an epoxy-based material, and the second adhesive composition may be composed of at least one of an ethylene-vinyl acetate (EVA)-based material, an acrylic-based material, an epoxy-based material, a polyolefin-based material, a rubber-based material, a polyamide-based material, and a polyurethane-based material. More preferably, among the above-mentioned materials, the second adhesive composition may be composed of at least one of a polyolefin-based material, a rubber-based material, a polyamide-based material, and a polyurethane-based material.

Therefore, the first adhesive part 310 can fix the first electrode 110 and the second electrode 150 to the lower separator 210 and/or the upper separator 250, respectively.

That is, unlike a conventional lamination process, the first adhesive part 310 can prevent movement between the electrodes 110 and 150 and the separators 210 and 250, and thus it can prevent deformation and breakage of the electrodes 110 and 150 and the separators 210 and 250.

Referring to FIGS. 1 and 3, the first adhesive part 310 and the second adhesive part 350 can have different physical properties and physical conditions from one another because they are located at different positions from one another.

The shear strength of the first adhesive part 310 may be equal to or smaller than the shear strength of the second adhesive part 350, where shear strength is measured as discussed below. For example, the shear strength of the first adhesive part 310 may be greater than or equal to 0.15 MPa and less than or equal to 0.5 MPa, and the shear strength of the second adhesive part 350 may be greater than or equal to 0.15 MPa and less than or equal to 3.5 MPa.

In one example, the shear strength of the first adhesive part 310 and the shear strength of the second adhesive part 350 may both be greater than or equal to 0.15 MPa and less than or equal to 0.5 MPa. More specifically, the shear strength of the first adhesive part 310 and the shear strength of the second adhesive part 350 may both be greater than or equal to 0.2 MPa and less than or equal to 0.5 MPa.

Thus, by having the shear strength of the first adhesive part 310 and the second adhesive part 350 in the above-mentioned range, the first adhesive part 310 and the second adhesive part 350 can be easily pressed by the pressure rolls 510 and 520 (FIG. 4).

By contrast, when the shear strength of the first adhesive part 310 and the second adhesive part 350 is less than 0.15 MPa, it may be disadvantageous to the adhesion and fixation between the electrodes 210 and 250 and the separators 210 and 250. Further, when the shear strength of the first adhesive part 310 and the second adhesive part 350 exceeds 0.5 MPa, the first adhesive part 310 may not be easily pressed by the pressure rolls 510 and 520 (FIG. 4), and thus the first thickness d1 of the first adhesive part 310 may be excessively large or non-uniform.

In another example, the shear strength of the first adhesive part 310 may be greater than or equal to 0.15 MPa and less than or equal to 0.5 MPa, and the shear strength of the second adhesive part 350 may be greater than or equal to 1.5 MPa and less than or equal to 3.5 MPa. More specifically, the shear strength of the first adhesive part 310 may be greater than or equal to 0.2 MPa and less than or equal to 0.5 MPa, and the shear strength of the second adhesive part 350 may be greater than or equal to 2.0 MPa and less than or equal to 3.5 MPa.

Thus, by having the shear strength of the second adhesive part 350 and the first adhesive part 310 in the above-mentioned range, the second adhesive part 350 may be easily pressed by the pressure rolls 510 and 520 (FIG. 4). Further, by having the shear strength of the second adhesive part 350 be larger than the shear strength of the first adhesive part 310, a phenomenon in which a part of the second adhesive part 350 comes into contact with the electrodes 110 and 150 or leaks outside the end parts of the separators 210 and 250 can be prevented.

By contrast, when the shear strength of the second adhesive part 350 is less than 1.5 MPa, the second adhesive part 350 may spread out on both sides in some processes, which can cause the problem that a part of the second adhesive part 350 comes in contact with the electrodes 110 and 150 or leaks outside the end parts of the separators 210 and 250. Further, when the shear strength of the second adhesive part 350 exceeds 3.5 MPa, the second adhesive part 350 may not be easily pressed by the pressure rolls 510 and 520 (FIG. 4), and thus the second thickness d2 of the second adhesive part 350 may be excessively large or non-uniform.

Further, the first thickness d1 of the first adhesive part 310 may be smaller than the second thickness d2 of the second adhesive part 350. More specifically, the first thickness d1 of the first adhesive part 310 is smaller than the thickness D1 of the electrodes 110 and 150, and the second thickness d2 of the second adhesive part 350 may be equal to or smaller than the thickness D1 of the electrodes 110 and 150. For example, as shown in FIG. 3, the first thickness d1 of the first adhesive part 310 is smaller than the thickness D1 of the first electrode 110, and the second thickness d2 of the second adhesive part 350 may be equal to or smaller than the thickness D1 of the first electrode 110.

Therefore, the first adhesive part 310 has a relatively small thickness, and thus any gap that may be generated between the electrodes 110 and 150 and the separators 210 and 250 can be reduced, thereby improving space efficiency of the unit cell 100. Further, the second adhesive part 350 has a thickness similar to that of the first electrode 110, and thus the thickness of the unit cell 100 may be relatively uniform while being able to provide beneficial fixation characteristics between the lower separator 210 and the upper separator 250.

Further, the first thickness d1 of the first adhesive part 310 may be greater than or equal to 0.01% and less than or equal to 10% of the thickness D1 of the electrodes 110 and 150. More specifically, the first thickness d1 of the first adhesive part 310 may be greater than or equal to 0.05% and less than or equal to 8% of the thickness D1 of the electrodes 110 and 150. In one example, the first thickness d1 of the first adhesive part 310 may be greater than or equal to 1% and less than or equal to 5.0% of the thickness D1 of the electrodes 110 and 150.

Therefore, by having a ratio of the first thickness d1 of the first adhesive part 310 to the thickness D1 of the electrodes 110 and 150 in the above-mentioned range, the thickness of the unit cell 100 may be relatively uniform while being able to provide beneficial fixation characteristics between the electrodes 110 and 150 and the separators 210 and 250.

By contrast, when the first thickness d1 of the first adhesive part 310 is less than 0.01% of the thickness D1 of the electrodes 110 and 150, the fixing force between the electrodes 110 and 150 and the separators 210 and 250 may not be sufficient, which can cause the problem that the electrodes 110 and 150 and the separators 210 and 250 become detached from each other during subsequent processing. Further, when the first thickness d1 of the first adhesive part 310 is larger than 10% of the thickness D1 of the electrodes 110 and 150, the interval between the electrodes 110 and 150 and the separators 210 and 250 may be too large, which can cause the problem that the space efficiency and the battery capacity of the unit cell 100 are reduced.

FIG. 4 is a cross-sectional view showing a process in which the unit cell of FIG. 2 is pressed.

With reference to FIG. 3, the first thickness d1 of the first adhesive part 310 and the second thickness d2 of the second adhesive part 350 discussed herein are defined as the thickness after the unit cell is pressed by the pressure rolls 510 and 520 in the vertical and both lateral directions of the unit cell 100. Such pressure rolls 510 and 520 may be rolls such as nip rolls, and they may press the unit cell 100 in the vertical and both lateral directions of the unit cell 100.

Additionally, before the unit cell 100 is pressed by the pressure rolls 510 and 520, but after the unit cell 100 has been assembled by stacking the electrodes 110 and 150 and separators 210 and 250 as shown in FIG. 4, a third thickness d3 of the first adhesive part 310 and a fourth thickness d4 of the second adhesive part 350 may be defined. The third thickness d3 of the first adhesive part 310 may be larger than the first thickness d1 of the first adhesive part 310. More specifically, the third thickness d3 of the first adhesive part 310 may be greater than or equal to 40% and less than or equal to 60% of the thickness D1 of the electrodes 110 and 150. In one example, the third thickness d3 of the first adhesive part 310 may be greater than or equal to 45% and less than or equal to 55% of the thickness D1 of the electrodes 110 and 150.

In addition, the fourth thickness d4 of the second adhesive part 350 may be larger than the second thickness d2. More specifically, the fourth thickness d4 of the second adhesive part 350 may be greater than or equal to 90% and less than or equal to 105% of the thickness D1 of the electrodes 110 and 150. In one example, the fourth thickness d4 of the second adhesive part 350 may be greater than or equal to 95% and less than or equal to 105% of the thickness D1 of the electrodes 110 and 150.

Therefore, by having the thickness of the first adhesive part 310 and the second adhesive part 350 in the above-mentioned range before the unit cell 100 is pressed by the pressure rolls 510 and 520, the thickness of the unit cell 100 after being pressed by the pressure rolls 510 and 520 may be relatively uniform while being able to provide beneficial fixation characteristics between the separators 210 and 250 or between the electrodes 210 and 250 and the separators 210 and 250.

Further, the adhesive strength of the first adhesive part 310 may be equal to or larger than that of the second adhesive part 350. As used herein, the adhesive strength of the first adhesive part 310 and the second adhesive part 350 are determined by applying the first adhesive composition and the second adhesive composition between a pair of pre-prepared surfaces of a tension jig and then vertically peeling them by applying a tensile force perpendicular to the plane of the surfaces on which the adhesive dots are applied. The dots are specifically applied in the form of 15 dots along a single line at an interval of 3 mm measured from the center of each dot, where the dots each have a diameter of about 500 μm±50 μm. For example, the first adhesive part or the second adhesive part are applied between two confronting stainless steel plates of the tension jig, and the adhesive strength is measured while the two stainless steel plates are pulled apart by applying a force perpendicular to the surfaces of the plates on which the adhesive dots are applied.

The adhesive strength of the first adhesive part 310 may preferably be greater than or equal to 50 gf/mm$^2$ and less than or equal to 100 gf/mm$^2$, and the adhesive strength of the second adhesive part 350 may be greater than or equal to 20 gf/mm$^2$ and less than or equal to 100 gf/mm$^2$. More specifically, the adhesive strength of the first adhesive part 310 may be greater than or equal to 55 gf/mm$^2$ and less than or equal to 95 gf/mm$^2$, and the adhesive strength of the second adhesive part 350 may be greater than or equal to 25 gf/mm$^2$ and less than or equal to 95 gf/mm$^2$. In one example, the adhesive strength of the first adhesive part 310 may be greater than or equal to 60 gf/mm$^2$ and less than or equal to 90 gf/mm$^2$, and the adhesive strength of the second adhesive part 350 may be greater than or equal to 25 gf/mm$^2$ and less than or equal to 90 gf/mm$^2$. In all of such cases, the relevant area over which the adhesive strength is determined (i.e., the mm$^2$ in the gf/mm$^2$ unit of adhesive strength) is the area of a region defined by connecting the outermost edges of the applied adhesive in a closed curve.

Therefore, by having the adhesive strengths of the first adhesive part 310 and the second adhesive part 350 in the above-mentioned ranges, the first adhesive part 310 and the second adhesive part 350 may each provide beneficial fixation characteristics between the separators 210 and 250 or between the electrodes 210 and 250 and the separators 210 and 250.

By contrast, when the adhesive strength of the first adhesive part 310 is less than 50 gf/mm$^2$ or greater than 100 gf/mm$^2$, a problem may be caused in which the electrodes 210 and 250 and the separators 210 and 250 become detached from each other during subsequent processing, or the manufacturing process may be more difficult. In addition, when the adhesive strength of the second adhesive part 350 is less than 20 gf/mm$^2$ or greater than 100 gf/mm$^2$, a problem may be caused in which the upper separator 250 and the lower separator 210 become detached from each other during subsequent processing, or the manufacturing process may be more difficult.

FIG. 5 is a diagram showing a process in which a first adhesive part and a second adhesive part included in the unit cell of FIG. 2 are applied.

The viscosity of the first adhesive part 310 may be equal to or smaller than the viscosity of the second adhesive part 350. More specifically, referring to FIGS. 3 and 5, the first adhesive part 310 and the second adhesive part 350 may be applied to the electrodes 110 and 150 and/or the separators 210 and 250 by a coating device 600. In one example, the coating device 600 may be a device such as an inkjet spraying device, and the coating device 600 may include a housing 610 defining an internal pressure chamber, a wall surface 620 that moves to reduce the volume of the pressure chamber, and an outlet port 610a through which the adhesive composition is discharged. The viscosity of the first adhesive part 310 and the second adhesive part 350 may be a discharge viscosity discharged from the outlet port 610a of the coating device 600.

More specifically, the viscosity of the first adhesive part 310 and the second adhesive part 350 may be a viscosity (cP at 150° C.) discharged from the outlet port 610a of the coating device 600 at 150 degrees Celsius. Preferably, the viscosity of the first adhesive part 310 may be greater than or equal to 50 cP at 150° C. and less than or equal to 120 cP at 150° C., and the viscosity of the second adhesive part 350 may be greater than or equal to 50 cP at 150° C. and less than or equal to 12000 cP at 150° C.

In one example, the viscosity of the first adhesive part 310 and the viscosity of the second adhesive part 350 may be greater than or equal to 60 cP at 150° C. and less than or equal to 110 cP at 150° C. More specifically, the viscosity of the first adhesive part 310 and the viscosity of the second adhesive part 350 may be greater than or equal to 70 cP at 150° C. and less than or equal to 100 cP at 150° C.

Therefore, by having the viscosities of the first adhesive part 310 and the second adhesive part 350 in the above-described ranges, the first adhesive part 310 and the second adhesive part 350 may each provide beneficial fixation characteristics between the separators 210 and 250 or between the electrodes 210 and 250 and the separators 210 and 250, and also the discharge stability of the coating device 600 may be improved.

By contrast, when the viscosity of the first adhesive part 310 and the second adhesive part 350 is less than 60 cP at 150° C., it may be disadvantageous to the adhesion and fixation between the electrodes 110 and 150 and the separators 210 and 250. In addition, when the viscosity of the first adhesive part 310 and the second adhesive part 350 exceeds 120 cP at 150° C., the first adhesive part 310 may not be easily pressed by the pressure rolls 510 and 520 (FIG. 4), and thus the first thickness d1 of the first adhesive part 310 may be excessively large or non-uniform.

In another example, the viscosity of the first adhesive part 310 may be greater than or equal to 60 cP at 150° C. and less than or equal to 110 cP at 150° C., and the viscosity of the second adhesive part 350 may be greater than or equal to 800 cP at 150° C. and less than or equal to 12000 cP at 150° C. More specifically, the viscosity of the first adhesive part 310 may be greater than or equal to 70 cP at 150° C. and less than or equal to 100 cP at 150°, and the viscosity of the second adhesive part 350 may be greater than or equal to 850 cP at 150° C. and less than or equal to 11000 cP at 150° C.

Therefore, by providing the first adhesive part 310 and the second adhesive part 350 with viscosities in the above-described ranges, the first adhesive part 310 and the second adhesive part 350 may each provide beneficial fixation characteristics between the separators 210 and 250 or between the electrodes 110 and 150 and the separators 210 and 250, and also the discharge stability of the coating device 600 may be improved. In addition, by having the viscosity of the second adhesive part 350 be larger than the viscosity of the first adhesive part 310, a phenomenon in which a part of the second adhesive part 350 comes into contact with the electrodes 110 and 150 or leaks outside the end parts of the separators 210 and 250 can be prevented.

By contrast, when the viscosity of the second adhesive part 350 is less than 800 cP at 150° C., the second adhesive part 350 may spread out on both sides in some processes, which can cause the problem that a part of the second adhesive part 350 comes into contact with the electrodes 110 and 150 or leaks outside the end parts of the separators 210 and 250. Further, when the viscosity of the second adhesive part 350 is larger than 12000 cP at 150° C., the resulting problem is that the discharge stability of the coating device 600 is reduced.

As shown in FIG. 3, the first width r1 of the second adhesive part 350 may be smaller than the distance D2 between the end parts of the separators 210 and 250 and the end parts of the electrodes 110 and 150. More specifically, the first width r1 of the second adhesive part 350 may be the width after the unit cell is pressed in the vertical and both lateral directions of the unit cell 100 by the pressure rolls 510 and 520. That is, the first width r1 of the second adhesive part 350 may be larger than the second width r2 of the second adhesive part 350 before being pressed by the pressure rolls 510 and 520 (as shown in FIG. 4).

Therefore, by having the first width r1 of the second adhesive part 350 be smaller than the distance D2 between the end parts of the separators 210 and 250 and the end parts of the electrodes 110 and 150, even after the second adhesive part 350 is pressed by the pressure rolls 510 and 520, a phenomenon in which a part of the second adhesive part 350 comes into contact with the electrodes 110 and 150 or leaks outside the end parts of the separators 210 and 250 can be prevented.

As shown in FIGS. 1 and 3, the first adhesive part 310 and the second adhesive part 350 may be formed in a pattern including a plurality of dots which are spaced apart from each other. Moreover, the intervals between the plurality of dots may be adjusted to be the same or different from each other, if necessary.

By forming the first adhesive part 310 and the second adhesive part 350 in a pattern such as a plurality of spaced apart dots, the electrode assembly can advantageously be rapidly impregnated when the electrolyte solution is injected into the electrode assembly 1100 (FIG. 4) including the plurality of unit cells 100. More specifically, since the plurality of dots are spaced apart from each other in the first adhesive part 310 and the second adhesive part 350, the electrolyte solution may advantageously flow between the plurality of dots. As a result, the manufacturing time of the battery cells 100 (FIG. 4) can be shortened and the yield can also be improved.

The presence of the first adhesive part 310 may block a lithium ion passage between the electrodes 110 and 150 and the separators 210 and 250. In order to prevent this, it may be preferable that the first adhesive part 310 is made of a material having a high solubility in an electrolyte solution.

According to an embodiment, the first adhesive part 310 and the second adhesive part 350 may include materials having different compositions from one another. In one example, the first adhesive composition forming the first adhesive part 310 may be composed of at least one of an ethylene-vinyl acetate (EVA)-based material, an acrylic-based material, and an epoxy-based material, and the second adhesive composition forming the second adhesive part 350 may be composed of at least one of a polyolefin-based material, a rubber-based material, a polyamide-based material, and a polyurethane-based material. For example, when the first adhesive composition is made of an acrylic material, it may exhibit a certain amount of solubility in the electrolyte because the acrylic material includes an ester group.

Therefore, the first adhesive composition included in the first adhesive part 310, may at least partially dissolve when the electrolyte solution is injected into the electrode assembly 1100 (FIG. 6) including a plurality of unit cells 100. That is, the first adhesive part 310 positioned between the electrodes 110 and 150 and the separators 210 and 250 is dissolved into the electrolyte solution, so that any obstruction of the lithium ion passage between the electrodes 110 and 150 and the separators 210 and 250 caused by the presence of the first adhesive part 310 may be reduced or eliminated.

Referring to FIG. 7, positioning the first adhesive composition (composed of at least one of an ethylene-vinyl acetate-based material, an acrylic material, and an epoxy-based material) at the location of the first adhesive part 310 (i.e., between the electrodes 110 and 150 and the separators 210 and 250) results in the LSV curve labeled '1.' On the other hand, positioning the second adhesive composition (composed of at least one of a polyolefin-based material, a rubber-based material, a polyamide-based material, and a polyurethane-based material) in the location of the second adhesive part 350 results in the LSV curve labeled '2,' which shows that the oxidation reaction occurs around 4.0 V. That may result in a side reaction in the battery cell, which may be a factor in reducing capacity and lifespan. Therefore, it is preferable not to use the second adhesive composition in the location of the first adhesive part 310. One of the reasons for providing the second adhesive part 350 is to prevent folding of the separator caused during the electrolyte injection process.

The separator according to the embodiment described herein may be a Ceramic Coated Separator (CCS). In general, the separator has a raw film and a coating layer formed on at least one surface of the raw film, and the coating layer may include alumina powder and a binder to aggregate them. In a Safety Reinforced Separator (SRS), a large amount of binder is coated on the surface of the coating layer, but, in CCS, the binder is not coated on the surface of the coating layer, or the binder content distributed on the surface may be very low compared to SRS. For example, in the case of the CCS separator according to the present embodiment, the content of the binder coated on the surface of the coating layer of the separator may be about 3 wt % or less.

When the separator is CCS, since the internal electrodes included in the electrode assembly are transported in an unfixed state, alignment may be disturbed during transport. Of course, when the separator is CCS, it may be fixed by heat and pressure, but the alignment of the internal electrodes may be disturbed even in the process of transferring the electrode and the separator to the fixing device for applying heat and pressure after forming the laminate of the electrode and the separator. In addition, there is a disadvantage in that an expensive separator having a high binder content must be used to attach the electrode and the separator by heat and pressure. On the other hand, according to the present embodiment, it is possible to increase the fixing force while preventing the alignment of the internal electrodes from being disturbed during transport.

The plurality of dots included in the second adhesive part 350 may have a diameter smaller than the distance D2 between the end parts of the electrodes 110 and 150 and the end parts of the separators 210 and 250. This is a similar concept and rationale as that discussed above in connection with the manner in which the widths r1 and r2 of the second adhesive part 350 are smaller than the distance D2 between the end parts of the electrodes 110 and 150 and the end parts of the separators 210 and 250.

FIG. 6 is a top view of a battery cell according to another embodiment of the present disclosure.

Referring to FIGS. 2 and 6, the battery cell 1000 according to another embodiment of the present disclosure includes an electrolyte solution together with the electrode assembly 1100 on which the above-mentioned unit cells 100 are alternately stacked. Here, first electrode tabs 1150 on which the first electrode tabs 115 of the unit cell 100 are stacked, and second electrode tabs 1550 on which the second electrode tabs 155 are stacked, can be electrically connected to electrode leads 3000, respectively. Lead films 4000 may be positioned above and/or below the electrode leads 3000.

Further, the electrode assembly 1100 is mounted inside a battery case 2000, wherein the electrode assembly 1100 and the electrolyte solution may be positioned in a concave receiving part 2100 of the battery case 2000. In addition, a sealing part 2500 of the battery case 2000 may be formed where the outer peripheral surfaces of the battery case 2000 are heat-fused and sealed together.

In one example, the electrolyte solution can be comprised of at least one of an organic liquid electrolyte, an inorganic liquid electrolyte, a solid polymer electrolyte, a gel polymer electrolyte, a solid inorganic electrolyte, an inorganic molten electrolyte or the like. The present disclosure is not limited thereto, however, and all electrolyte solutions commonly used in the art can be included.

Hereinafter, the present disclosure will be further described with reference to more specific examples. The following examples are for illustrative purposes only, however, and the scope of rights based on the present disclosure is not limited thereto.

Experimental Example 1—Measurement of Shear Strength, Viscosity, and Adhesive Strength The shear strength, viscosity, and adhesive strength were respectively measured for adhesive compositions utilizing:

an ethylene-vinyl acetate (EVA)-based material, an acrylic-based material, an epoxy-based material, a polyolefin-based material, a rubber-based material, a polyamide-based material, and a polyurethane-based material.

The acrylic-based material used was an adhesive known as acResin® 204UV available from BASF SE; the EVA-based material used was an adhesive known as Technomelt® 4046 available from Henkel AG & Co. KGaA (hereinafter "Henkel"); the epoxy-based material used was an adhesive known as Loctite® EA608 available from Henkel; the polyolefin-based material used was an adhesive known as Supra502 available from Henkel; the rubber-based material used was an adhesive known as DISPOMELT® 2802 (hereinafter "2802dispomelt") available from Henkel; the polyamide-based material used was an adhesive known as HPX 002 available from Henkel; and the polyurethane-based material used was an adhesive known as EH9702 available from H.B. Fuller Company.

The shear strength was measured with a universal testing machine (UTM) in accordance with the ASTM D3163 standard. The results are shown in Table 1 below.

The viscosity was measured utilizing a viscometer sold by AMETEK Brookfield with model number DV2T LV TJ10. The measurement was performed under the condition of 10 rpm by replacing the spindle part of the viscometer with a cone and plate, and applying a CPA-40Z cone. The results are shown in Table 1 below.

The adhesive strength was measured by applying one of the above-mentioned adhesive compositions in the form of 15 dots at an interval of 3 mm between a pair of pre-prepared tension jigs, and then peeling them vertically. The results are shown in Table 1 below.

TABLE 1

|  | Adhesive composition | Shear strength (MPa) | Viscosity (cPs@ 150° C.) | Adhesive strength (gf/mm$^2$) |
| --- | --- | --- | --- | --- |
| Acrylic-based | acResin 204UV | 0.30 | 80 | 80~85 |
| EVA-based | Technomelt 4046 | 0.35 | 88 | 78~80 |
| Epoxy-based | Loctite EA608 | 0.45 | 97 | 70~73 |
| Polyolefin-based | Supra502 | 2.10 | 870 | 45~50 |
| Rubber-based | 2802dispomelt | 2.85 | 1210 | 30~35 |
| Polyamide-based | HPX 002 | >3.0 | >10000 | 35~40 |
| Polyurethane-based | EH9702 | 2.95 | 1150 | 35~40 |

Example 1

$LiNi_{0.6}Mn_{0.2}Co_{0.2}O_2$ as a cathode active material, carbon black as a conductive material, and polyvinylidene fluoride (PVdF) as a binder were used, and NMP as a solvent was added to a mixture of cathode active material:conductive material:binder in a weight ratio of 96:2:2 to prepare a cathode active material slurry. The cathode active material slurry was applied to an aluminum current collector, then dried and rolled to manufacture a cathode. The thickness of the cathode was 200 um.

An artificial graphite as an anode active material, carbon black as a conductive material, and SBR emulsion aqueous solution as a binder were used, and water was added to a mixture of anode active material:conductive material:binder in a weight ratio of 94:1:5 to prepare an anode active material slurry. The anode active material slurry was applied to a copper current collector, then dried and rolled to manufacture an anode. The thickness of the anode was 200 um.

A slurry mixed with $Al_2O_3$ and PVDF in a weight ratio of 94:6 was applied on both sides (each thickness: 3 μm) of a base sheet (thickness: 10 μm) made of polyethylene/polypropylene, and dried at 60° C. to manufacture a separator. The separator is referred to as an upper separator and a lower separator, depending on the position.

The manufactured lower separator, anode, upper separator, and cathode were alternately stacked in that order to manufacture a unit cell in which a first adhesive part composed of acResin 204UV was positioned between the separator and the anode and between the separator and the cathode, and a second adhesive part composed of acResin 204UV was positioned between the upper separator and the lower separator.

Example 2

A unit cell was manufactured in the same manner as in Example 1, except that a composition composed of Supra502 was used for the second adhesive part.

Example 3

A unit cell was manufactured in the same manner as in Example 1, except that a composition composed of Loctite EA608 was used for the first adhesive part and a composition composed of Supra502 was used for the second adhesive part.

Example 4

A unit cell was manufactured in the same manner as in Example 1, except that a composition composed of Technomelt 4046 was used for the first adhesive part, and a composition composed of Supra502 was used for the second adhesive part.

Comparative Example 1

A unit cell was manufactured in the same manner as in Example 1, except that a composition composed of Supra502 was used for the first adhesive part.

Comparative Example 2

A unit cell was manufactured in the same manner as in Example 1, except that the second adhesive part was not formed between the upper separator and the lower separator.

Comparative Example 3

A unit cell was manufactured in the same manner as in Example 1, except that a composition composed of 2802dispomelt was used for the first adhesive part, and the second adhesive part was not formed between the upper separator and the lower separator.

Comparative Example 4

A unit cell was manufactured in the same manner as in Example 1, except that a composition composed of Supra502 was used for the second adhesive part, and the first adhesive part was not formed between the separator and the anode and between the separator and the cathode.

Comparative Example 5

A unit cell was manufactured in the same manner as in Example 1, except that a composition composed of 2802dispomelt was used for the second adhesive part, and a first adhesive part was not formed between the separator and the anode and between the separator and the cathode.

Experimental Example 2—Measurement of Electrode Misalignment and Adhesive Part Thickness For the unit cells manufactured in Examples 1 to 4 and Comparative Examples 1 to 5, the electrode misalignment was measured at a resolution of 33 um/pixel under the conditions of 170 kV, 200 umA, and 34 W by using a Computerized Tomography (CT) Scanner from GE. The results are shown in Table 2 below.

In addition, for the unit cells manufactured in Examples 1 to 4 and Comparative Examples 1 to 5, the thicknesses of the first adhesive part and/or the second adhesive part were measured after being pressed in the vertical and both lateral directions of the unit cell by a pressure roll. The results are shown in Table 2 below.

Example 1, the thickness of the first adhesive part is 25% to 30% or less relative to the thickness (200 um) of the electrode, and the thickness of the first adhesive part appears excessively large, unlike Examples 1 and 2.

In the case of Supra502 used in Comparative Example 1, the shear strength and viscosity are larger than those of acResin 204UV, Loctite EA608, and Technomelt 4046 used in Examples 1 to 4, and the thickness of the first adhesive part is larger than that of Examples 1 to 4. In addition, the same result occurs in the case of 2802dispomelt, HPX 002, and EH9702, which have higher shear strengths than Supra502.

Therefore, when the first adhesive part is composed of at least one of acrylic-based, EVA-based, and epoxy-based materials such as acResin 204UV, Loctite EA608, and Technomelt 4046, the thickness of the first adhesive part can be very small compared to the thickness of the electrode (200 um) without generating the problem of electrode misalignment.

Further, in the case of the second adhesive part, even if it is composed of acResin 204UV or Supra502, as in Examples 1 to 4 and Comparative Example 1, the thickness of the second adhesive part is substantially equal to or smaller than the thickness (200 um) of the electrode, without generating the problem of electrode misalignment. That is, the thickness of the second adhesive part is almost the same after pressing, regardless of the shear strength and viscosity of the composition.

TABLE 2

| | First adhesive part | Second adhesive part | Electrode misalignment | Thickness of adhesive part (um) First adhesive part | Thickness of adhesive part (um) Second adhesive part |
|---|---|---|---|---|---|
| Example 1 | acResin 204UV | acResin 204UV | OK | 3~4 | 190~200 |
| Example 2 | acResin 204UV | Supra502 | OK | 3~4 | 190~200 |
| Example 3 | Loctite EA608 | Supra502 | OK | 9~10 | 190~200 |
| Example 4 | Technomelt 4046 | Supra502 | OK | 8~8.5 | 190~200 |
| Comparative Example 1 | Supra502 | acResin 204UV | OK | 50~60 | 190~200 |
| Comparative Example 2 | acResin 204UV | — | OK | 3~4 | — |
| Comparative Example 3 | 2802dispomelt | — | OK | 60~70 | — |
| Comparative Example 4 | — | Supra502 | NG | — | 190~200 |
| Comparative Example 5 | — | 2802dispomelt | NG | — | 190~200 |

<Analysis of Experimental Results>

Referring to Table 1 and Table 2, when a composition composed of acResin 204UV, Loctite EA608, and Technomelt 4046 was used for the first adhesive part as in Examples 1 to 4, the problem of electrode misalignment was not generated, the thickness of the first adhesive part was 5% or less relative to the thickness (200 um) of the electrode, and the thickness of the second adhesive part was substantially equal to or smaller than the thickness (200 um) of the electrode. In particular, in the case of Example 1, a composition composed of acResin 204UV was used for the second adhesive part, unlike Examples 2 to 4, and thus both the first adhesive part and the second adhesive part had excellent adhesive strength.

In contrast, when the composition composed of Supra502 was used for the first adhesive part as in Comparative Therefore, the second adhesive composition can be composed of at least one of acrylic-based, EVA-based, epoxy-based, polyolefin-based, rubber-based, polyamide-based, and polyurethane-based materials, such as acResin 204UV, Loctite EA608, Technomelt 4046, Supra502, 2802dispomelt, HPX 002, and EH9702.

However, if the shear strength or viscosity of the second adhesive part is small, a phenomenon can occur when the second adhesive part is left for a long time in the process, which is that a part of the second adhesive part comes into contact with the electrode or leaks outside the end part of the separator.

Therefore, it may be more preferable that the second adhesive part is composed of at least one of polyolefin-based, rubber-based, polyamide-based, and polyurethane-based materials, such as Supra502, 2802dispomelt, HPX 002, and EH9702, as in Examples 2 to 4.

In addition, when only the first adhesive part is positioned in the unit cell, as in Comparative Examples 2 and 3, Comparative Example 2 has the same thickness as Examples 1 and 2 of the first adhesive part, unlike Comparative Example 3. However, in Comparative Example 2 and Comparative Example 3, an adhesive layer between the upper separator and the lower separator is not formed, and thus a problem may occur in which the separator becomes folded during subsequent processing, and the defect rate of the electrode may be increased.

In addition, when only the second adhesive part is positioned in the unit cell, as in Comparative Examples 4 and 5, all the thicknesses of the second adhesive parts are similar to those of Examples 1 to 4. However, an adhesive layer between the separator and the cathode and between the separator and the anode is not formed, whereby the problem of electrode misalignment can result, and the defect rate of the electrode can be increased.

Therefore, unlike Comparative Examples 2 to 5, Examples 1 to 4 include both the first adhesive part and the second adhesive part in the unit cell, whereby the first adhesive part and the second adhesive part can prevent movement between the electrode and the separator and between the separator and the separator, and unlike the conventional lamination process, it is possible to prevent deformation and breakage of the electrode and the separator.

FIG. 8 is a cross-sectional view showing an electrode assembly according to an embodiment of the present disclosure.

Referring to FIG. 8, the electrode assembly 3 according to the present embodiment may include an electrode stack 40 manufactured by repeatedly forming a basic unit 30 a plurality of times. Such basic unit 30 may be a unit in which the separator 322 is folded to have a zigzag shape, covers the electrode 31, and the electrode 31 and the separator 322 are stacked. That is, in the basic unit 30, one side and the other side of the separator 322 are sequentially folded to cover the electrode 31, and the electrode 31 and the separator 322 may be sequentially stacked.

A fixing tape may be attached to the electrode assembly 3, but one end of the separator 322 may cover a portion of the outer surface of the electrode stack 40 instead of the fixing tape. The basic unit 30 of the present embodiment may be in a state in which the electrodes 3112 and 3122 and the separator 322 are adhered to each other with an adhesive 34. Such adhesive 34 may preferably be the same first adhesive composition included in the first adhesive part 310 discussed above. Accordingly, the alignment between the electrodes 3112 and 3122 and the separator 322 may be maintained by the adhesive force of the adhesive 34. A method and apparatus for assembling such an electrode stack 40 with a zigzag folded separator and with adhesive 34 applied between successive layers of electrode and separator is disclosed in International Publication No. WO 2021/194285, entitled Cell Manufacturing Device And Method, the entire contents of which are incorporated herein by reference.

In the electrode stack 40 of this embodiment, the separator 322 covers the upper and lower portions and one side of the electrodes 3112 and 3122, so that the stacking alignment of the basic units 30 can be maintained without the fixing tape. In addition, when the fixing tape is attached to the outside of the electrode stacked body 40 of this embodiment or one end of the separator 322 is wrapped around the electrode stacked body 40, the stacking alignment of the basic units 30 is more stably maintained.

Also, in the electrode assembly 3 manufactured in this embodiment, the adhesive 34 may be disposed at the same lateral positions between the electrodes 3112 and 3122 and the separator 322. For example, as shown in FIG. 8, in the electrode assembly 3 of this embodiment, the adhesive 34 positioned between the lower portion of the first electrode 3112 and the separator 322 may have the same lateral positions (orthogonal to the stacking direction) as the adhesive 34 between the upper portion of the first electrode 3112 and the separator 322. Moreover, the spacings between the adhesive 34 positions at each of those two interfaces may be equal to each other.

Accordingly, in the electrode assembly 3 manufactured in this embodiment, the adhesive 34 is disposed at the same positions between the electrodes 3112 and 3122 and the separator 322, which beneficially reduces process time and increases efficiency.

FIG. 9 is a cross-sectional view showing an electrode assembly according to another embodiment of the present disclosure.

Referring to FIG. 9, the locations of the adhesive 34 may be staggered in alternating layers. For example, as shown in FIG. 9, in the electrode assembly 4 of this embodiment, the first adhesive 34-1 positioned between the lower portion of the first electrode 3112 and the separator 322 may have positions within the lateral plane that are shifted with respect to those of the second adhesive 34-2 positioned between the upper portion of the first electrode 3112 and the separator 322, although the spacings between the adhesive positions in each of those planes may be equal to each other.

However, the present invention is not limited thereto, and the structure in which the first adhesive 34-1 and the second adhesive 34-2 are displaced from each other may be accomplished in various ways.

Accordingly, by staggering the positions of the adhesive 34 in successive layers, it is possible to minimize an increase in the thickness of the electrode assembly 4 due to the adhesive 34. In addition, since the adhesives 34 disposed in adjacent layers are displaced from each other, the adhesive 34 may be more easily dissolved in the electrolyte when provided in the battery cell, as described above.

The first adhesive composition included in the first adhesive part 310 may be used as the adhesive 34 used in the electrode assemblies 3 and 4 according to FIGS. 8 and 9.

Although the invention has been shown and described with reference to preferred embodiments, it is to be understood that the invention is not limited to such disclosed embodiments, but, on the contrary, is intended to cover various modifications and equivalent arrangements included within the spirit and scope of the appended claims.

DESCRIPTION OF REFERENCE NUMERALS

100: unit cell
110: first electrode
150: second electrode
210: lower separator
250: upper separator
310: first adhesive part
350: second adhesive part
510, 520: pressure roll
600: coating device
1000: battery cell
1100: electrode assembly
2000: battery case
3000: electrode lead
4000: lead film

The invention claimed is:

1. A unit cell comprising:
a stack including an electrode positioned between a first separator and a second separator;
a first adhesive part that is positioned at an electrode-separator interface defined between the electrode and at least one of the first and second separators so as to affix the electrode and the at least one of the first and second separators to one another at the electrode-separator interface, the first adhesive part being composed of a first adhesive composition, and the first adhesive part being arranged in a plurality of discrete locations of the first adhesive composition spaced apart from one another over the electrode-separator interface; and
a second adhesive part that is positioned at a separator-separator interface defined between the first separator and the second separator so as to affix the first and second separators to one another at the separator-separator interface, the second adhesive part being composed of a second adhesive composition,
wherein a shear strength of the first adhesive part is less than or equal to a shear strength of the second adhesive part.

2. The unit cell of claim 1, wherein:
the shear strength of the first adhesive part is greater than or equal to 0.15 MPa and less than or equal to 0.5 MPa, and
the shear strength of the second adhesive part is greater than or equal to 0.15 MPa and less than or equal to 3.5 MPa.

3. The unit cell of claim 1, wherein:
the shear strength of the second adhesive part is greater than or equal to 1.5 MPa and less than or equal to 3.5 MPa.

4. The unit cell of claim 1, wherein:
a viscosity of the first adhesive part is less than or equal to a viscosity of the second adhesive part.

5. The unit cell of claim 4, wherein:
the viscosity of the first adhesive part is greater than or equal to 50 cP at 150° C. and less than or equal to 120 cP at 150° C., and
the viscosity of the second adhesive part is greater than or equal to 50 cP at 150° C. and less than or equal to 12000 cP at 150° C.

6. The unit cell of claim 5, wherein:
the viscosity of the second adhesive part is greater than or equal to 800 cP at 150° C. and less than or equal to 12000 cP at 150° C.

7. The unit cell of claim 1, wherein:
a thickness of the first adhesive part is smaller than a thickness of the electrode, and
a thickness of the second adhesive part is smaller than or equal to the thickness of the electrode.

8. The unit cell of claim 7, wherein:
the thickness of the first adhesive part is greater than or equal to 0.01% of the thickness of the electrode and less than or equal to 10% of the thickness of the electrode, and
the thickness of the second adhesive part is greater than or equal to 90% of the thickness of the electrode and less than or equal to 100% of the thickness of the electrode.

9. The unit cell of claim 1, wherein:
an adhesive strength of the first adhesive part is greater than or equal to an adhesive strength of the second adhesive part.

10. The unit cell of claim 9, wherein:
the adhesive strength of the first adhesive part is greater than or equal to 50 gf/mm$^2$ and less than or equal to 100 gf/mm$^2$, and
the adhesive strength of the second adhesive part is greater than or equal to 20 gf/mm$^2$ and less than or equal to 100 gf/mm$^2$.

11. The unit cell of claim 1, wherein:
the second adhesive part is positioned between an end part of the electrode and an end part of the first and second separators.

12. The unit cell of claim 11, wherein:
a width of the second adhesive part is smaller than a distance between the end part of the electrode and the end part of the first and second separators.

13. The unit cell of claim 11, wherein:
the first adhesive part and the second adhesive part are each arranged in a pattern including a plurality of dots spaced apart from each other.

14. The unit cell of claim 13, wherein:
each of the plurality of dots of the second adhesive part have a diameter smaller than a distance between an end part of the electrode and an end part of the first and second separators.

15. The unit cell of claim 1, wherein:
the first adhesive composition is composed of at least one of an ethylene-vinyl acetate (EVA)-based material, an acrylic-based material, and an epoxy-based material, and
the second adhesive composition is composed of at least one of an ethylene-vinyl acetate (EVA)-based material, an acrylic-based material, an epoxy-based material, a polyolefin-based material, a rubber-based material, a polyamide-based material, and a polyurethane-based material.

16. The unit cell of claim 15, wherein:
the second adhesive composition is composed of at least one of a polyolefin-based material, a rubber-based material, a polyamide-based material, and a polyurethane-based material.

17. An electrode assembly defined by a plurality of the unit cells of claim 1 stacked along a stacking direction, wherein:
the electrode-separator interface defined between the electrode and the at least one of the first and second separators includes a first interface defined between the electrode and the first separator and a second interface defined between the electrode and the second separator; and
the first adhesive part is arranged in a first pattern over the first interface and a second pattern over the second interface, the first and second patterns each including a plurality of dots of the first adhesive part spaced apart from each other in a lateral dimension defined orthogonal to the stacking direction, wherein each of the plurality of dots of the first pattern are disposed at the same respective positions in the lateral dimension as the plurality of dots of the second pattern.

18. An electrode assembly defined by a plurality of the unit cells of claim 1 stacked along a stacking direction, wherein:
the electrode-separator interface defined between the electrode and the at least one of the first and second separators includes a first interface defined between the electrode and the first separator and a second interface defined between the electrode and the second separator; and the first adhesive part is arranged in a first pattern over the first interface and a second pattern over the second interface, the first and second patterns each including a plurality of dots of the first adhesive part spaced apart from each other in a lateral dimension defined orthogonal to the stacking direction, wherein the plurality of dots of the first pattern are disposed at positions in the lateral dimension that are staggered with respect to the plurality of dots of the second pattern.

19. A battery cell comprising an electrolyte solution together with an electrode assembly including a stack of a plurality of the unit cells of claim 1.

20. The battery cell of claim 19, wherein:
the first adhesive part is at least partially dissolved into the electrolyte solution.

21. The battery cell of claim 17, wherein:
the first separator and the second separator are each respective portions of an elongated separator folded to have a zigzag shape.

\* \* \* \* \*